(12) United States Patent
Asaoka et al.

(10) Patent No.: US 8,088,037 B2
(45) Date of Patent: Jan. 3, 2012

(54) STRADDLE TYPE VEHICLE, POWER UNIT AND CONTINUOUSLY VARIABLE TRANSMISSION

(75) Inventors: Ryousuke Asaoka, Shizuoka (JP); Hiroyuki Aoki, Shizuoka (JP)

(73) Assignee: Yamaha Hatsudoki Kabushiki Kaisha, Iwata-Shi (JP)

( * ) Notice: Subject to any disclaimer, the term of this patent is extended or adjusted under 35 U.S.C. 154(b) by 923 days.

(21) Appl. No.: 12/058,488

(22) Filed: Mar. 28, 2008

(65) Prior Publication Data
US 2008/0242499 A1    Oct. 2, 2008

(30) Foreign Application Priority Data

Mar. 30, 2007  (JP) ................................ 2007-094033
Sep. 21, 2007  (JP) ................................ 2007-246274

(51) Int. Cl.
  *F16H 61/662*  (2006.01)
(52) U.S. Cl. ................ 477/43; 477/44; 477/46
(58) Field of Classification Search ............... 477/43, 477/44, 45, 46
  See application file for complete search history.

(56) References Cited

U.S. PATENT DOCUMENTS

| | | | |
|---|---|---|---|
| 6,380,640 B1* | 4/2002 | Kanamori et al. | 290/40 C |
| 6,476,573 B2* | 11/2002 | Omata et al. | 318/445 |
| 2002/0014872 A1* | 2/2002 | Morimoto et al. | 318/445 |
| 2010/0094516 A1* | 4/2010 | Sawada | 701/55 |

FOREIGN PATENT DOCUMENTS

| | | |
|---|---|---|
| EP | 1 089 025 A1 | 4/2001 |
| EP | 1 340 929 A2 | 9/2003 |
| EP | 1 767 827 A1 | 3/2007 |
| JP | 04-131558 | 5/1992 |
| JP | 04-210156 | 7/1992 |
| JP | 07-119804 | 5/1995 |

* cited by examiner

*Primary Examiner* — Ha D. Ho
(74) *Attorney, Agent, or Firm* — Rabin & Berdo, PC

(57) ABSTRACT

A straddle-type vehicle in which drivability is ensured when starting the vehicle. The vehicle includes a control device that controls a continuously variable transmission. A plurality of driving modes "A" and "B" are set in the control device. The control device performs a first control that switches the driving mode to driving mode "A" before start of the engine; a second control that switches between driving modes A" and "B" in response to operation of a mode switching operation member; and a third control that limits the second control and inhibits switching from the driving mode "A" to driving mode "B", when the control device detects that the engine has not been started.

9 Claims, 9 Drawing Sheets

STRADDLE TYPE VEHICLE, POWER UNIT AND CONTINUOUSLY VARIABLE TRANSMISSION

RELATED APPLICATIONS

This application claims the benefit of priority under 35 USC 119 of Japanese patent application no. 2007-094033, filed on Mar. 30, 2007, and Japanese patent application no. 2007-246274, filed on Sep. 21, 2007, which applications are hereby incorporated by reference in their entireties.

BACKGROUND OF THE INVENTION

1. Field of the Invention

The present invention relates to a continuously variable transmission (CVT), and more specifically to a straddle-type vehicle equipped with an electronically controlled CVT.

2. Description of Related Art

In straddle-type vehicles, such as scooter motorcycles, a V-belt type continuously variable transmission (CVT) is widely used. A V-belt type CVT includes a primary shaft to which output of a power source, such as an engine, is input, a secondary shaft that extracts output to be transmitted to a driving wheel, and a paired primary sheave and a secondary sheave that are respectively disposed on the primary shaft and the secondary shaft. The groove width of each of the sheaves is designed to be variable, and a V-belt is wound around the sheaves. The V-belt type CVT has a groove width adjustment mechanism that is used to vary the groove width of each sheave. As a result, the winding diameter of the V-belt around each sheave is adjusted to adjust the speed change ratio between the sheaves in a continuously variable manner.

The primary and secondary sheaves are each formed by a fixed flange and a movable flange that form a V groove therebetween. Each movable flange moves in an axial direction of the primary or secondary shaft. The groove width adjustment mechanism moves the moveable flange to adjust the speed change ratio in a continuously variable manner.

A known V-belt type CVT of this type uses an electric motor to move a movable flange of a primary sheave, thereby adjusting the groove width. The movement driving force of the electric motor moves the moveable flange in either a direction that narrows the width of the primary sheave (a Top side) or a direction that widens the width of the groove of the primary sheave (a Low side), thereby allowing adjustment of the groove width (for example, refer to Japanese Patent No. 3043061).

A scooter motorcycle provided with a mechanism for electronically controlling a V-belt type CVT automatically changes the speed change ratio without requiring the rider to perform any operations, based on a program (map) that has been input in advance for the vehicle speed and the engine speed. Accordingly, the rider's driving operation is simpler. Attempts have been made to apply this automatic CVT to various types of vehicles.

When a vehicle equipped with such a CVT runs down a downward slope, the vehicle may coast down the downward slope by inertia with the engine stopped. In this case, if a mechanism that changes the speed change ratio in response to the vehicle speed is used, when the engine is started after a certain speed is reached, the clutch may be engaged immediately. At this time, a problem may occur, namely, an unpleasant sensation may be felt because of an inconsistency between the rider's operation and the actual acceleration movement of the vehicle.

As shown in, for example, FIG. 9, a CVT 1 includes a primary sheave 3 connected to a primary shaft 3a that is rotated by an engine 2, a secondary sheave 4 connected to a secondary shaft 4a that outputs power to a rear (driving) wheel 7 via a centrifugal clutch 6 and a V-belt 5 wound around primary sheave 3 and secondary sheave 4. A groove width adjustment mechanism adjusts the groove width of primary sheave 3, thereby continuously adjusting the speed change ratio.

CVT 1 may include a mechanism for changing the speed change ratio in response to the vehicle speed when the vehicle runs down a downward slope with engine 2 stopped. In this case, when engine 2 is started in a state where a certain speed has been reached, an event may occur where shifting is rapidly performed based on a program (map) that has been input in advance for the vehicle speed and engine speed. When such an event occurs, there is a possibility that the rotation speed of secondary sheave 4 located downstream of engine 2 will also increase, thus instantaneously engaging centrifugal clutch 6. As a result, the feeling in this case is completely different from that in the case of clutch engagement when starting normally. As a result, an unpleasant sensation may be felt because of an inconsistency between the rider's operation and the actual vehicle movement. The inventors of the present invention have found that this unpleasant sensation caused by the inconsistency between the rider's operation and the vehicle movement may be felt depending on the engagement state of centrifugal clutch 6, and have devised a mechanism that reduces the unpleasant sensation being felt when the centrifugal clutch is engaged, thus achieving the present invention.

SUMMARY OF THE INVENTION

A straddle-type vehicle according to the invention is provided with an engine, a continuously variable transmission (CVI) connected to the engine, and a control device that controls the CVT. The straddle-type vehicle includes a mode switching operation member, and a plurality of driving modes are set in the control device. The control device performs a first control that switches, before start of the engine, the driving mode to a determined driving mode among the plurality of driving modes that has been determined in advance. Further, the control device performs a second control that switches between the plurality of driving modes in response to operation of the mode switching operation member. Furthermore, the control device performs a third control that limits the second control and inhibits switching from the determined driving mode to another driving mode, when the control device detects that the engine has not been started.

According to the invention, the control device performs the first control that switches the driving mode, before start of the engine, to the determined driving mode among the plurality of driving modes that has been determined in advance; the second control that switches between the plurality of driving modes in response to operation of the mode switching operation member; and the third control that limits the second control and inhibits switching from the determined driving mode to the other driving mode, when the control device detects that the engine has not been started. Therefore, it is possible to fix the driving mode at the time of engine start in the determined driving mode, and to always start the vehicle in the same driving mode. Thus, drivability immediately after start-up (when the vehicle is starting) is maintained at a constant level.

In addition, when the control device detects that the engine has just been started and when the driving mode has not been switched to the determined driving mode among the plurality of driving modes that has been determined in advance, the control device performs a fourth control that switches the driving mode to the determined driving mode. In this case, even if a centrifugal clutch is engaged by starting the engine in a state where a certain speed is reached, for example, when running down a downward slope, an unpleasant sensation caused by an inconsistency between the rider's operation and actual movement of the vehicle is reduced, thereby improving rider comfort.

Other features and advantages of the invention will be apparent from the following detailed description, taken in conjunction with the accompanying drawings that illustrate, by way of example, various features of embodiments of the invention.

DETAILED DESCRIPTION OF THE INVENTION

Figure 1:
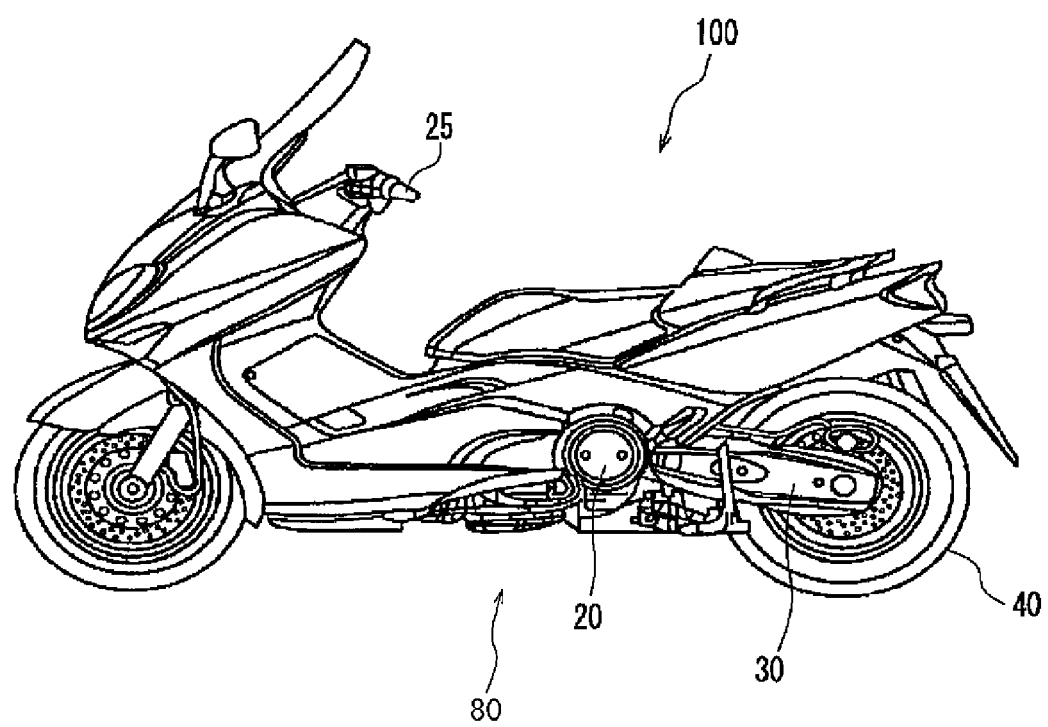
FIG. 1 is a side view of a straddle-type vehicle according to an embodiment of the invention.

Embodiments of the invention are now described with reference to the drawings. In the following drawings, structural members that have the same or similar operations are denoted with the same or similar reference numerals and the description thereof will be omitted. Note that the invention is not limited to the following embodiments.

Figure 2:
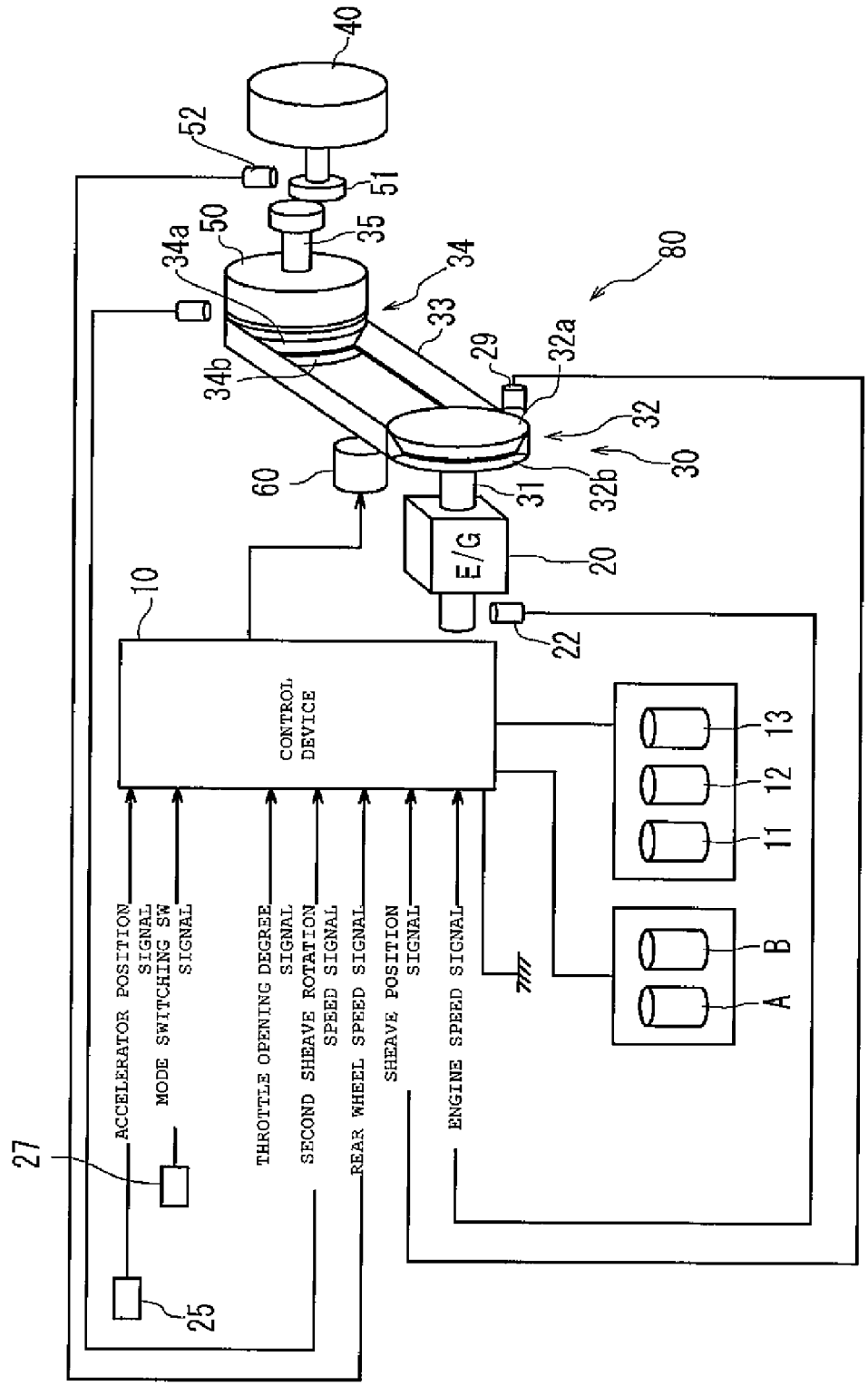
FIG. 2 is a block diagram of a continuously variable transmission (CVT) mounted in the straddle-type vehicle according to the embodiment of the invention and its peripheral structure.

FIG. 1 is a side view of a straddle-type vehicle 100 according to an embodiment of the invention. FIG. 2 is a block diagram of a control device 10, and its peripheral configuration, installed in straddle-type vehicle 100.

As shown in FIG. 2, straddle-type vehicle 100 includes a driving source (engine) 20 having an output that is controlled in response to an accelerator operation member 25 operated by a rider, a continuously variable transmission (CVT) 30 connected to engine 20, and control device 10 that electronically controls CVT 30. Engine 20 and CVT 30 form a power unit 80.

Straddle-type vehicle 100 may be a scooter motorcycle (as illustrated) in which driving force generated by engine 20 is transmitted to a rear (driving) wheel 40 through CVT 30. In the case of a motorcycle, accelerator operation member 25 operated by the rider may be either an accelerator attached to a handle or an accelerator grip.

CVT 30 includes a primary sheave 32 connected to a primary shaft 31 (for example, a crank shaft) that is rotated by engine 20, a secondary sheave 34 connected to a secondary shaft 35 that outputs power to rear (driving) wheel 40 via a centrifugal clutch 50 and a speed reduction mechanism 51, and a V-belt 33 wound around primary sheave 32 and secondary sheave 34. The speed change ratio is continuously and steplessly controlled by changing the groove width of each sheave.

Primary sheave 32 and secondary sheave 34 are structured by fixed flanges (32a, 34a) and movable flanges (32b, 34b) that are respectively attached to primary shaft 31 and secondary shaft 35. Movable flanges (32b, 34b) are provided such that they can move in the direction of primary shaft 31 and in the direction of secondary shaft 35, respectively. The fixed flanges are also referred to as fixed sheaves, and the movable flanges are also referred to as movable sheaves.

Movable flange 34b of secondary sheave 34 is urged in a direction that narrows the groove width by a groove width adjustment mechanism. The groove width adjustment mechanism may be a spring attached to movable flange 34b, and a torque cam provided in a section of movable flange 34b.

The groove width of primary sheave 32 is adjusted by controlling the movement of movable flange 32b (to slidably move it in the direction of primary shaft 31) using an actuator 60. The output of actuator 60 can move movable flange 32b both in the direction that narrows the groove width of primary sheave 32 (i.e., to the Top side), and in the direction that widens the groove width (i.e., to the Low side). Thus, it is possible to freely adjust the groove width.

Actuator 60 in this embodiment is an electric motor. The output of electric motor 60 is controlled by the power supplied to electric motor 60. That is, electric motor 60 converts electric energy supplied thereto into mechanical energy, and outputs it to movable flange 32b, thereby moving movable flange 32b.

Actuator 60 is electrically connected to shift control device 10. Control device 10 is structured by an electronic control device (ECU or Electronic Control Unit). The ECU may be configured by a microcomputer (MPU), for example. Control device 10 calculates the speed change ratio corresponding to a vehicle running condition (such as vehicle speed, throttle opening degree) based on a control map (program) that has been registered in advance, and issues a shift command to CVT 30 to achieve the speed change ratio, thereby finally achieving the speed change ratio.

The actual control is performed such that a target value of the speed change ratio (target speed change ratio) is calculated from the control map based on information about the vehicle speed and the throttle opening, and the position of the movable sheave of the primary sheave is controlled by driving electric motor 60 to achieve the target speed change ratio. The control map is stored in a memory unit provided in control device 10. Alternatively, a memory unit that is electrically connected to control device 10 may be provided outside of control device 10, and the control map may be stored in the memory unit. The memory unit may be configured by, for example, a semiconductor memory (a RAM, a flash memory, or the like) or a hard disc.

In a CVT that is electronically controlled as described above, a plurality of shift characteristics can be set by preparing a plurality of control maps. In CVT 30, two shift characteristics that can be appropriately changed in accordance with the intention of the rider are set.

A plurality of driving modes for controlling CVT 30 are set in control device 10. In addition, control device 10 performs a first control 11, a second control 12 and a third control 13. Control device 10 performs various controls in accordance with a program set in advance.

First control 11 is a control for switching the driving mode, before the start of engine 20, to a determined driving mode (A) among the plurality of driving modes (A, B) that has been determined in advance. Second control 12 is a control for switching between the plurality of driving modes (A, B) in response to operation of a mode switching operation member 27. Third control 13 is a control for limiting second control 12 and inhibiting switching from the determined driving mode (A) to the other driving mode (B) when it is detected that the engine has not been started.

The "determined driving mode" is a driving mode that has been determined in advance among the plurality of driving modes set in control device 10. It is also referred to as "normal mode" or "initial mode" as appropriate.

Figure 3:
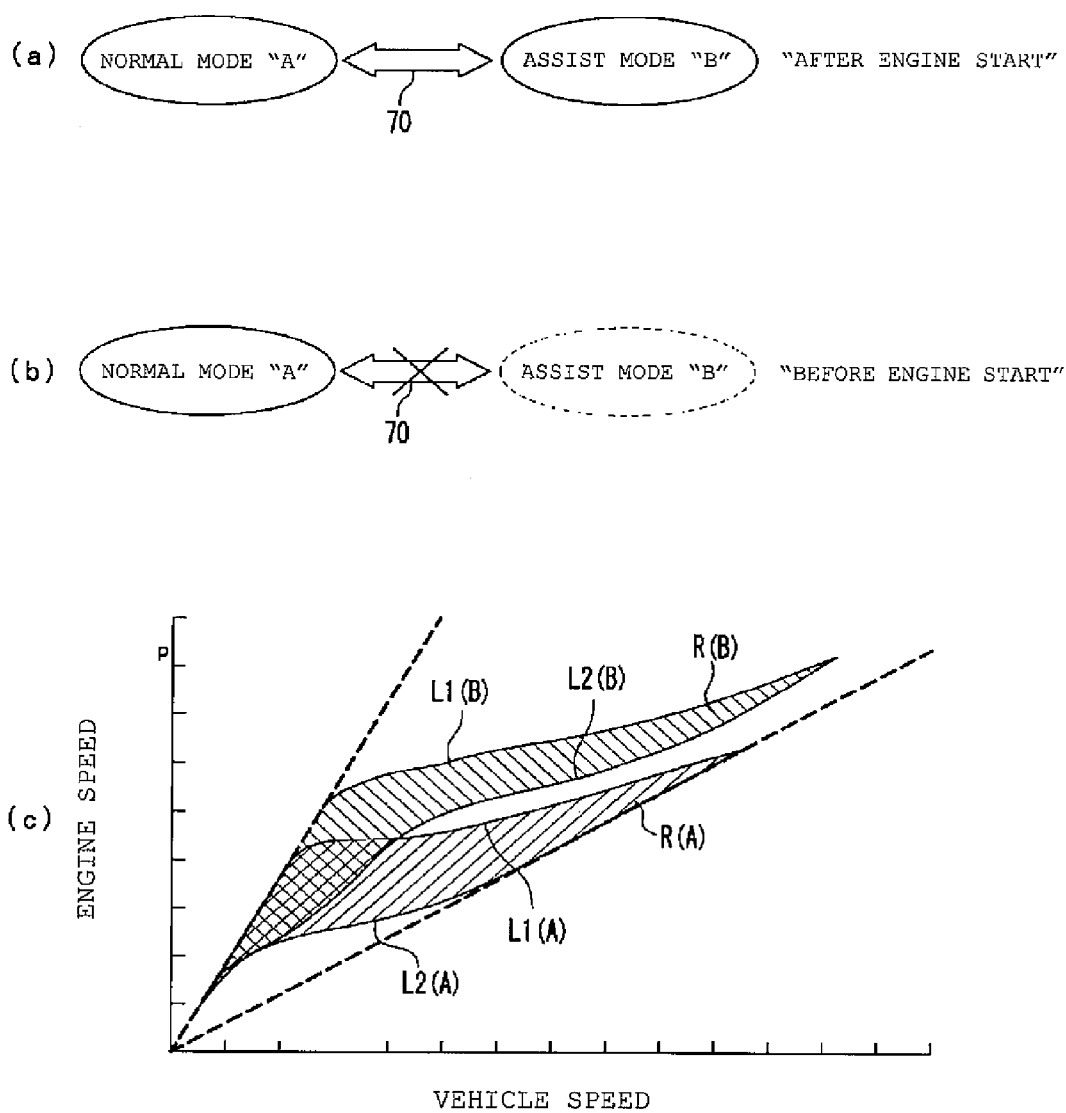
FIGS. 3(a)-(c) are diagrams that explain driving modes set for the CVT.

As shown in FIG. 3(a), two driving modes, a normal mode "A" and an assist mode "B", are used in CVT 30. "Driving mode" as used herein denotes the shift characteristics (shifting method) set for the CVT. Normal mode "A" is a driving mode in which the engine speed in the shift region is set low aiming to reduce fuel consumption, noise, etc. (an economy mode). On the other hand, assist mode "B" is a driving mode in which the engine speed in the shift region is set higher than that in normal mode "A" so as to give priority to output performance of the engine (a power mode).

As shown in FIG. 3(c), normal mode "A" and assist mode "B" have different shift characteristic diagrams (control maps) as shown by the vehicle speed-engine speed diagrams. In FIG. 3(c), R(A) shows the shift characteristic (control map) that is set in normal mode "A", and R(B) shows the shift characteristic (control map) that is set in assist mode "B". As indicated in FIG. 3(c), at the same vehicle speed, as the engine speed becomes higher, the speed change ratio of the CVT is set to be larger (to the Low side).

As is obvious from comparison of the shift characteristics (control maps) of normal mode "A" and assist mode "B", at the same vehicle speed, the engine speed of normal mode "A" is set to be lower than that of assist mode "B". That is, the speed change ratio in normal mode "A" is set to be smaller (to the Top side) than that in assist mode "B".

Control device 10 switches the driving mode to the determined driving mode (A) among the plurality of driving modes (A, B) that has been determined in advance, before the start of engine 20 (the first control). Further, control device 10 switches between the plurality of driving modes (A, B) in response to operation of mode switching operation member 27 (the second control). Furthermore, when control device 10 detects that the engine has not been started, it limits second control 12 and inhibits switching from the determined driving mode (A) to the other driving mode (B)(the third control).

As shown in FIG. 3(a), control device 10 switches between the plurality of driving modes (here, normal mode "A" and assist mode "B") in response to operation of mode switching operation member 27 that is provided separately from accelerator operation member 25. That is, normal mode "A" and assist mode "B" are switched between (arrow "70") in accordance with the intention of the rider (typically, by manually operating buttons). Thus, an optimal driving mode reflecting the intention of the rider can be selected, and the rider can enjoy comfortable driving.

As shown in FIG. 3(b), control device 10 can selectively fix the driving mode (shift characteristics) of CVT 30 in the initial mode in the state where engine 20 is turned off. The "initial mode" as used herein is a driving mode that has the smallest speed change ratio (to the Top side) among the plurality of driving modes (shift characteristics) set in the CVT.

That is, normal mode "A", which has a smaller speed change ratio (to the Top side) than assist mode "B", corresponds to the initial mode.

When control device 10 detects that engine 20 has not yet been started, it issues a mode switching inhibition command, thereby inhibiting switching from normal mode "A" (initial mode), to which the driving mode has been shifted before the start of engine 20, to assist mode "B" (driving mode other than the initial mode).

As described above, actual control is performed using control maps (R(A), R(B)) as shown in FIG. 3(c). The target value of the speed change ratio (target speed change ratio) is calculated from control maps (R(A), R(B)) of the respective driving modes, based on information about the vehicle speed and the throttle opening degree, and electric motor 60 is driven to achieve the target speed change ratio, thereby controlling the position of the movable sheave of the primary sheave. Control map R(A) shows the control map of normal mode "A", and control map R(B) shows the control map of assist mode "B". Further, control map R(A) and control map R(B) indicate a region (control region) that is defined by the control maps. This control region is the region surrounded by line L1(A) and line L1(B), which indicate the relationship between the vehicle speed and the target value of the engine speed when the throttle valve is fully opened, and by line L2(A) and line L2(B), which indicate the relationship between the vehicle speed and the target value of the engine speed when the throttle valve is fully closed.

For example, if the control is performed based on control map R(A) while the vehicle is running in normal mode "A", the target value of the engine speed is calculated by computation based on information about the vehicle speed and the throttle opening degree. More specifically, the position of the horizontal axis in FIG. 3(c) is determined based on the information about the vehicle speed. Then, the target value of the engine speed is determined within the region of map R(A) in accordance with the throttle opening degree. In this case, as the throttle opening increases, the target value of the engine speed is increased (controlled to the Low side in order to increase the speed change ratio), and as the throttle opening degree reduces, the target value of the engine speed is reduced (controlled to the Top side in order to reduce the speed change ratio), thereby achieving smooth acceleration and deceleration. Control device 10 calculates the target value of the engine speed, while repeatedly performing the above-described computation based on the information about the vehicle speed and the throttle opening degree that change with time, thereby controlling the speed change ratio of CVT 30.

In CVT 30 as described above, when the speed change ratio reaches or exceeds a certain value, the clutch tends to engage along with an increase in the rotation speed of the secondary sheave. Hypothetically, if the target value of the engine speed is set such that the speed change ratio exceeds a value at which the clutch is caused to engage, setting the target value of the engine speed further to the Top side will reduce an abrupt sensation that is felt when engine brake is applied immediately after the clutch engagement. As is apparent from comparison of control map R(A) and control map R(B), control map R(A) is set such that the speed change ratio is smaller (to the Top side) than that in control map R(B). Accordingly, the control based on control map R(A) more effectively reduces the abrupt sensation felt when engine brake is applied.

In the embodiment, normal mode "A" is set as the initial mode. However, normal mode "A" may be set to another driving mode among the plurality of driving modes, as long as it is a driving mode in which the speed change ratio is set to be reduced (to the Top side). The number of driving modes that can be set is not limited to two, and three or more driving modes may be set in CVT 30. For example, a third driving mode, in which the speed change ratio is set further to the Top side than normal mode "A", may be set and used as the initial mode.

Further, the embodiment employs a method of switching between the driving modes in which the driving modes are switched by switching the control maps. However, the method of switching between the driving modes is not limited to this. For example, the shift characteristics may be changed, not by switching the control maps, but by multiplication with a determined conversion factor. More specifically, the target speed change ratio calculated from a determined control map may be multiplied by the determined conversion factor (for example, 1.35), thus making it possible to switch to shift characteristics where the speed change ratio is increased (shifted to the Low side) (a "shift-down mode"). In this case, the number of the shift-down modes may be set to one. Alternatively, a configuration may be adopted in which two or more shift-down modes are set, and shift-down is performed such that the speed change ratio is sequentially increased (shifted to the Low side) in response to a button operation by the rider (a "multi-speed shift-down mode"). The determined conversion factor is stored in the form of a factor map in the memory unit that is provided inside or outside of the control device.

Figure 4:
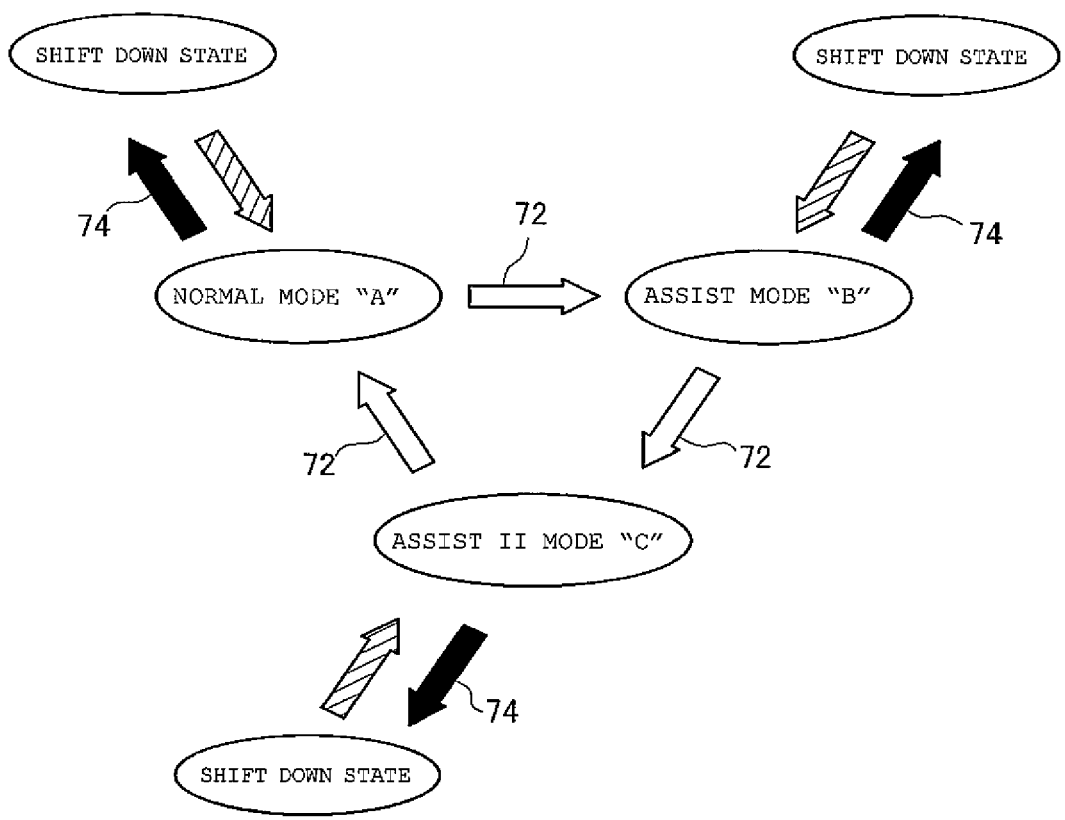
FIG. 4 is a diagram that explains driving modes set for the CVT.

FIG. 4 illustrates another example of the method of switching between the driving modes. As shown in FIG. 4, switching between the driving modes may be performed by a combination of switching of the driving modes based on the control maps, and the shift-down mode set by multiplication with a conversion factor. In the example shown in FIG. 4, three driving modes (i.e., normal mode "A", assist mode "B", and an assist II mode "C") can be sequentially switched between in response to operation of mode switching operation member 27 (refer to arrows 72 in FIG. 4). A configuration is adopted in which each of the driving modes can be shifted to a shift-down state (refer to arrows 74 in FIG. 4). Even in this case, it is possible to inhibit the occurrence of the unpleasant sensation when the clutch is engaged, by fixing the driving mode in normal mode "A" (i.e., the driving mode that is set to have the smallest speed change ratio (to the Top side)) before starting the engine.

Referring back to FIG. 2, the control performed by the control device of the CVT is described in detail.

Straddle-type vehicle 100 includes an engine speed sensor 22 for detecting the speed of engine 20. Control device 10 detects whether engine 20 has not yet been started based on whether the engine speed detected by engine speed sensor 22 is zero.

Engine speed sensor 22 for detecting the speed of engine 20 is electrically connected to control device 10, and outputs an engine speed signal to control device 10. When control device 10 detects that engine 20 has not yet been started via engine speed sensor 22, it issues a mode switching inhibition command. More concretely, the mode switching inhibition command is issued based on the engine speed signal (more specifically, an engine speed signal indicating that the engine speed is zero) output from engine speed sensor 22. The mode switching inhibition command is not limited to the engine speed signal output from engine speed sensor 22, A configuration may be adopted in which the mode switching inhibition command is issued based on other information that indicates that the engine has not yet been started (for example, by determining whether ignition or injection has been performed based on "ON" of a main switch).

A rear wheel speed sensor 52 for detecting the speed of rear wheel 40 is electrically connected to control device 10. Rear wheel speed sensor 52 is disposed in the vicinity of rear wheel 40, and outputs a rear wheel speed signal to control device 10. The vehicle speed can be obtained from the rear wheel speed signal.

A mode switching switch (mode switching SW), serving as mode switching operation member 27, is electrically connected to control device 10. Switching among the plurality of driving modes is performed by the rider turning on the mode switching switch. The mode switching switch may be, for example, a mode switching button.

A sheave position detecting device 29 for detecting the flange position of movable flange 32b of primary sheave 32 is connected to control device 10. Sheave position detecting device 29 outputs information about the position of the movable flange (a movable flange position signal) to control device 10. Control device 10 uses the movable flange position signal to control electric motor 60. A variety of signals (for example, a throttle opening signal, a secondary sheave rotation speed signal, etc.), as well as the rear wheel speed signal, the engine speed signal, the movable flange position signal, are input to control device 10.

Next, a control method of control device 10 is described with reference to the flowchart in FIG. 5.

First, control device 10 switches the driving mode, before the start of engine 20, to the determined driving mode (A) among the plurality of driving modes (A, B) that has been determined in advance (the first control). Control device 10 proceeds to step S20 when the main switch (the main power source of vehicle 100) is turned "ON" at step S10, and the driving mode is shifted to the initial mode (here, normal mode "A").

Next, when control device 10 detects that the engine has not yet been started, it limits second control 12 and inhibits switching from the determined driving mode (A) to the other driving mode (B) (the third control). Control device 10 determines whether or not there is a driving mode switching request (here, a switching request to assist mode "B") (step S30). When there is a driving mode switching request, then it is determined at step S40 whether engine 20 has been started. When engine 20 has not yet been started, the process proceeds to step S50 where the mode switching request is rejected, and the driving mode is confirmed and set to the initial mode (normal mode "A") maintained (step S70).

On the other hand, when step S40 determines that engine 20 has been started, the routine proceeds to step S60 where the mode switching request is accepted, and the switching from the initial mode (normal mode "A") to the other mode (assist mode "B") is performed, and the driving mode is confirmed and set in this state (step S70).

In this manner, the driving mode when the engine is started can be fixed in the initial mode (normal mode "A"). In this example, the driving mode is shifted to the initial mode when the main switch is turned "ON". However, it is sufficient if the driving mode is shifted to the initial mode before the start of the engine. Therefore, the timing for the shift to the initial mode is not limited to when the main switch is turned "ON". For example, it is acceptable to adopt a configuration in which the shift to the initial mode is performed at the timing when the engine is turned off, such that when the main switch is turned "ON" next time, the shift to the initial mode has already been completed. Alternatively, it is also acceptable to adopt a configuration in which the shift to the initial mode is performed when the main switch is turned "OFF", such that when the main switch is turned "ON" next time, the shift to the initial mode has already been completed.

Figure 6:
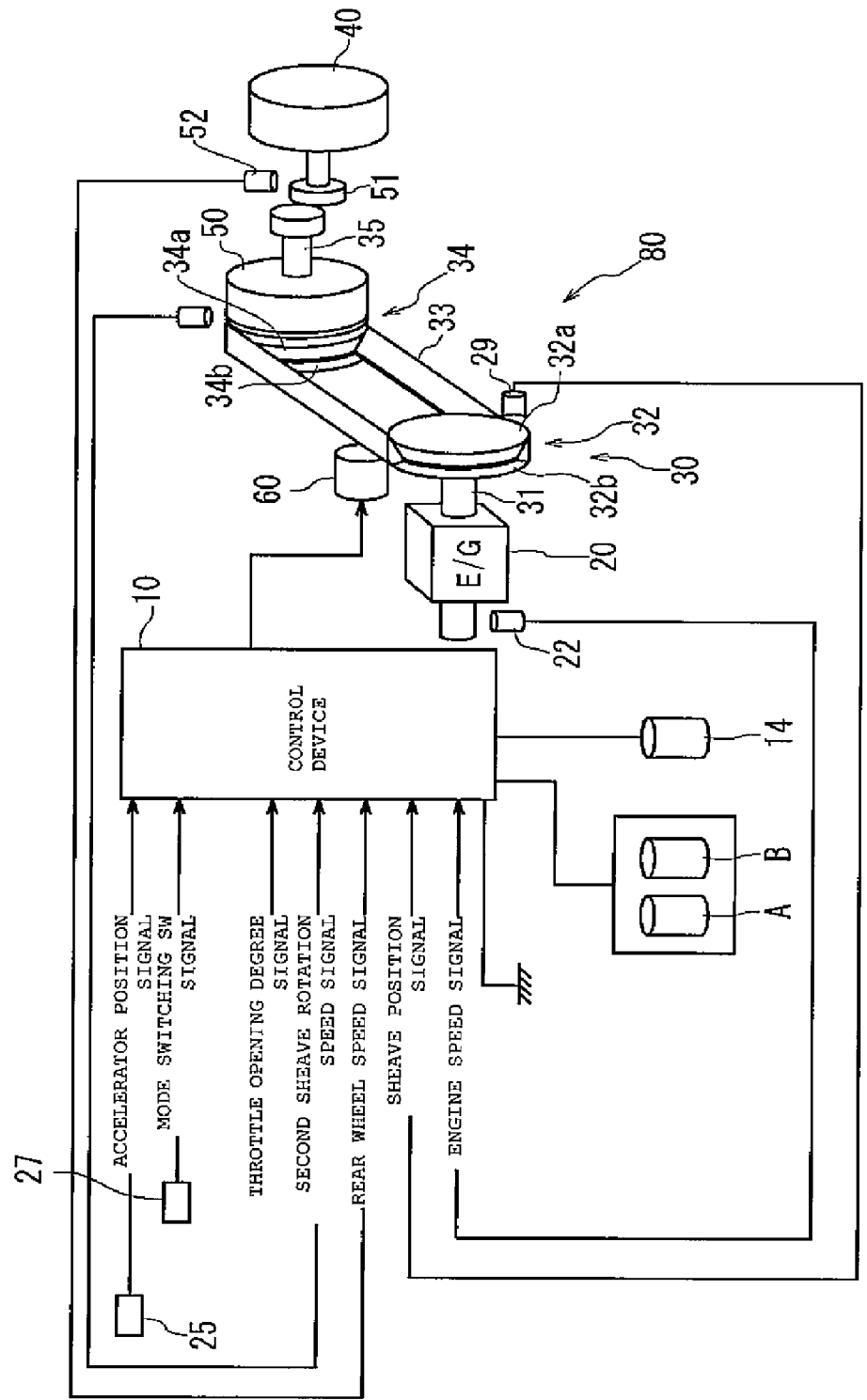
FIG. 6 is a block diagram of a CVT and its peripheral structure according to another embodiment of the invention.
Figure 7:
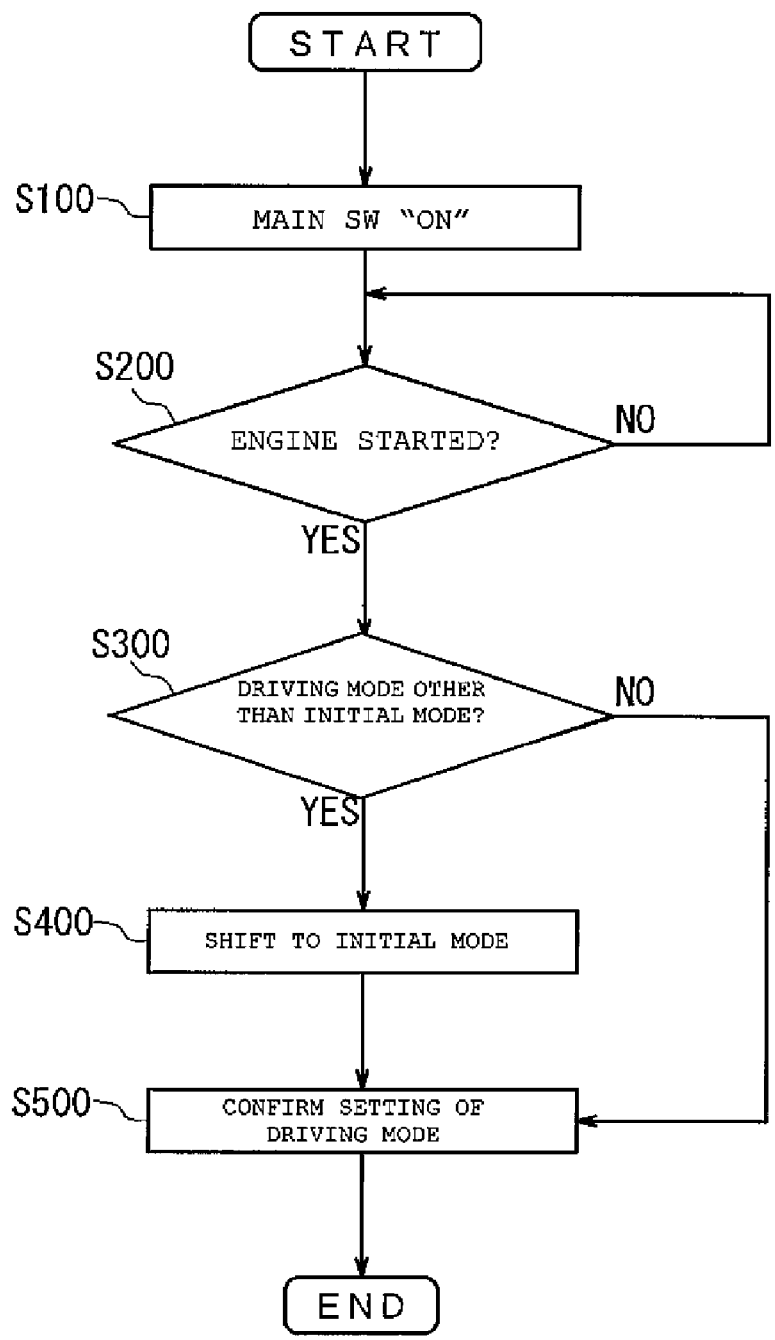
FIG. 7 is a flow chart of a control device according to the other embodiment of the invention.

Another embodiment of the invention is described with reference to FIG. 6. This embodiment is different from the above-described embodiment in that the shift to the initial mode is not performed before the start of the engine, but performed immediately after the start of the engine. Accordingly, structural members that are the same or similar to those of straddle-type vehicle 100 are denoted by the same or similar reference numerals and a repeated explanation thereof is omitted.

In this embodiment, when control device 10 detects that engine 20 has just been started and when the driving mode has not been shifted to the determined driving mode (A) among the plurality of driving modes (A, B) that has been determined in advance, control device 10 switches the driving mode to the determined driving mode (A) (a fourth control 14).

In this embodiment, control device 10 is configured such that it detects the state where engine 20 has just been started, and based on the detection result, control device 10 can perform control to switch the driving mode to the initial mode (normal mode "A") from the other driving mode (assist mode "B"). That is, switching of the driving mode is permitted before the engine start, but the driving mode is shifted to the initial mode in accordance with the timing of the engine start. Even with the configuration described above, it is possible to start running the vehicle in the initial mode (normal mode "A"), in which the speed change ratio is set to be reduced (to the Top side), after the start of the engine. Thus, the unpleasant sensation caused by the inconsistency between the rider's operation and the actual movement of the vehicle.

In this embodiment, control device 10 detects whether engine 20 has just been started, based on whether or not the speed of engine 20 has increased from zero. That is, control device 10 can detect the state where engine 20 has just been started, via engine speed sensor 22. More specifically, control device 10 performs control that switches the driving mode to the initial mode (normal mode "A") from the other driving mode (assist mode "B") in response to the engine speed signal indicating that the engine speed has been increased from zero.

Next, a control method of control device 10 is described. First, when the main switch (the main power source of vehicle 100) is turned "ON" at step S100, the routine proceeds to step S200 where control device 10 determines whether engine 20 has been started. The determination at step S200 is repeatedly performed at short intervals (for example, every 50 ms), until it is determined that the engine has been started.

When it is determined at step S200 that the engine has been started, control device 10 determines at step S300 whether the current driving mode is a driving mode other than the initial mode (normal mode "A"). When it is determined at step S300 that the current driving mode has already been set to the initial mode (normal mode "A"), the routine proceeds to step S500, and the initial mode (normal mode "A") is maintained and the driving mode is confirmed and set as it is.

On the other hand, when it is determined at step S300 that the current driving mode is a driving mode other than the initial mode (normal mode "A"), namely, assist mode "B", the switching to the initial mode (normal mode "A") from the other switching mode (assist mode "B") is performed (step S400), and the driving mode is confirmed and set as it is (step S500).

In the above-described configuration, even if the driving mode is switched to a driving mode other than the initial mode (normal mode "A") after the main switch is turned "ON", it is possible to surely switch the diving mode to the initial mode immediately after the engine start. In addition, the determination at step S200 as to whether the engine has been started is repeatedly executed at very short intervals (for example, 50 ms). Accordingly, even if the driving mode is switched after the engine start, it does not affect the actual change in the speed change ratio.

The invention is not limited to the above-described embodiments.

For example, the structure of CVT 30 is not limited to those described in the above-described embodiments. For example, the CVT may have a structure in which a V-belt is wound around primary and secondary sheaves, and an actuator and a control device are used to adjust the groove width of the primary sheave.

Figure 8:
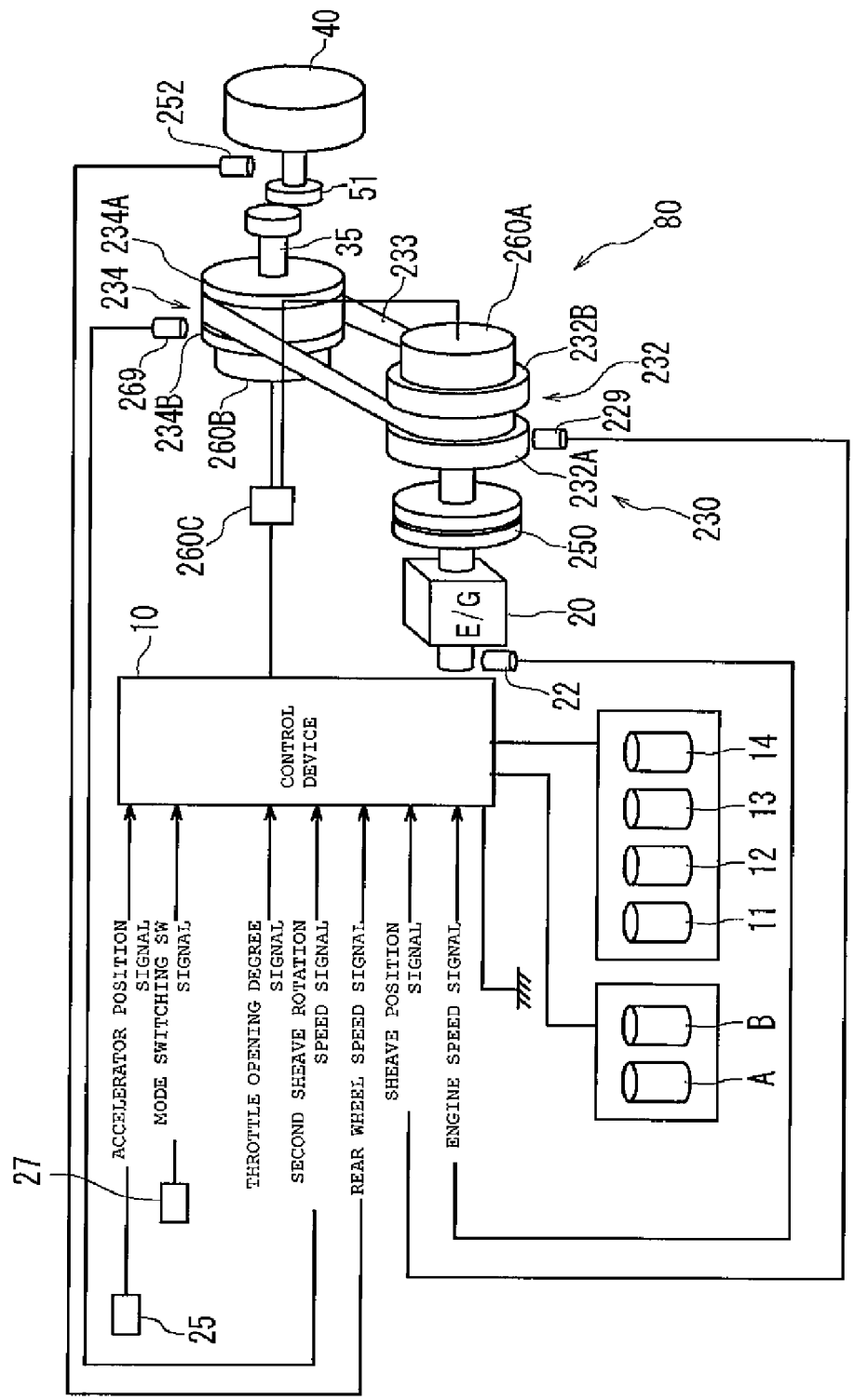
FIG. 8 is a block diagram of a metal belt CVT and its peripheral structure.
Figure 9:
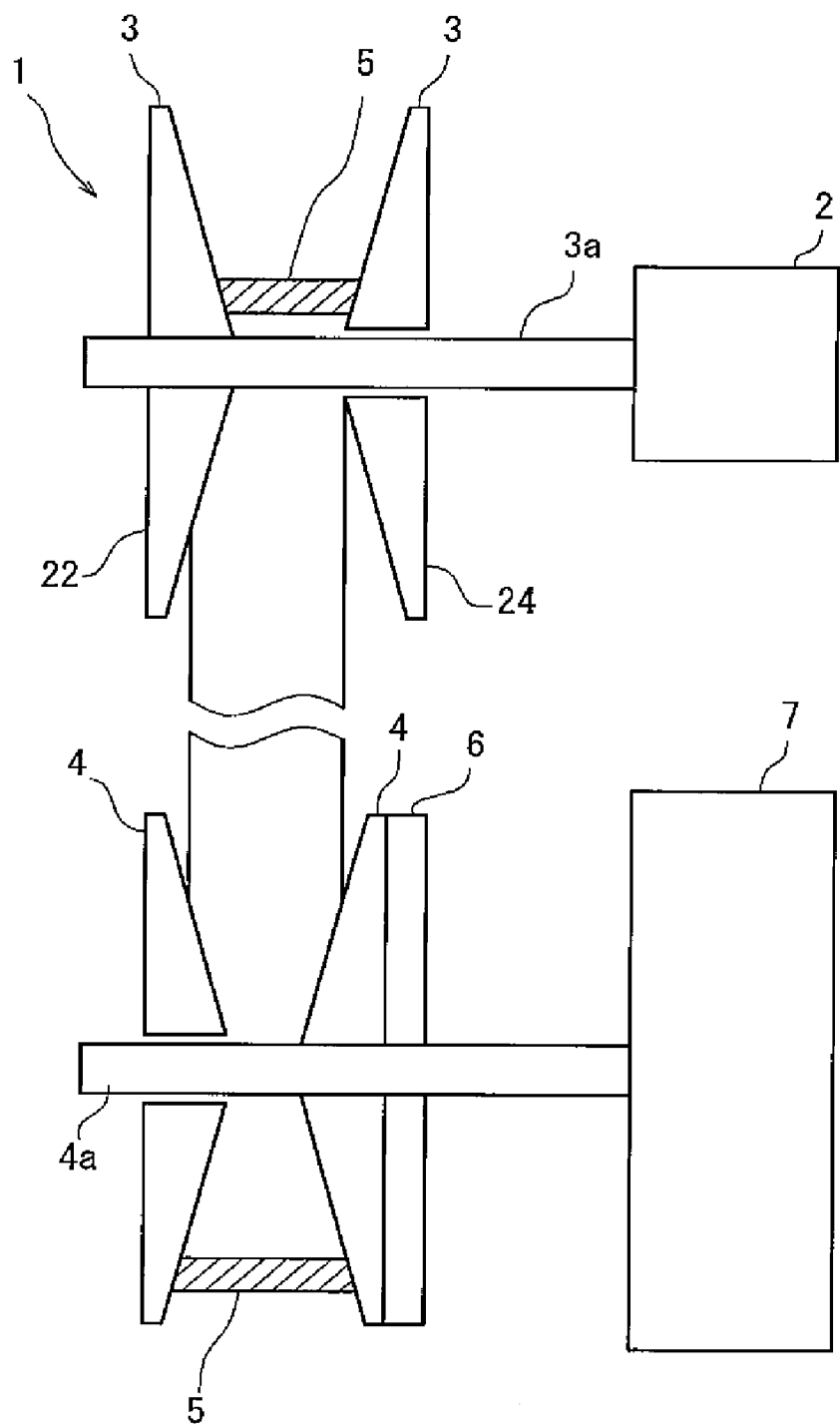
FIG. 9 is a diagram that explains the mechanism of the CVT.

For example, a metal V-belt CVT may be adopted as shown in FIG. 8. Structural members and sections of the CVT of FIG. 8 that effect the same operation as those in the CVTs of FIGS. 2 and 6 are denoted by the same reference numerals.

Figure 5:
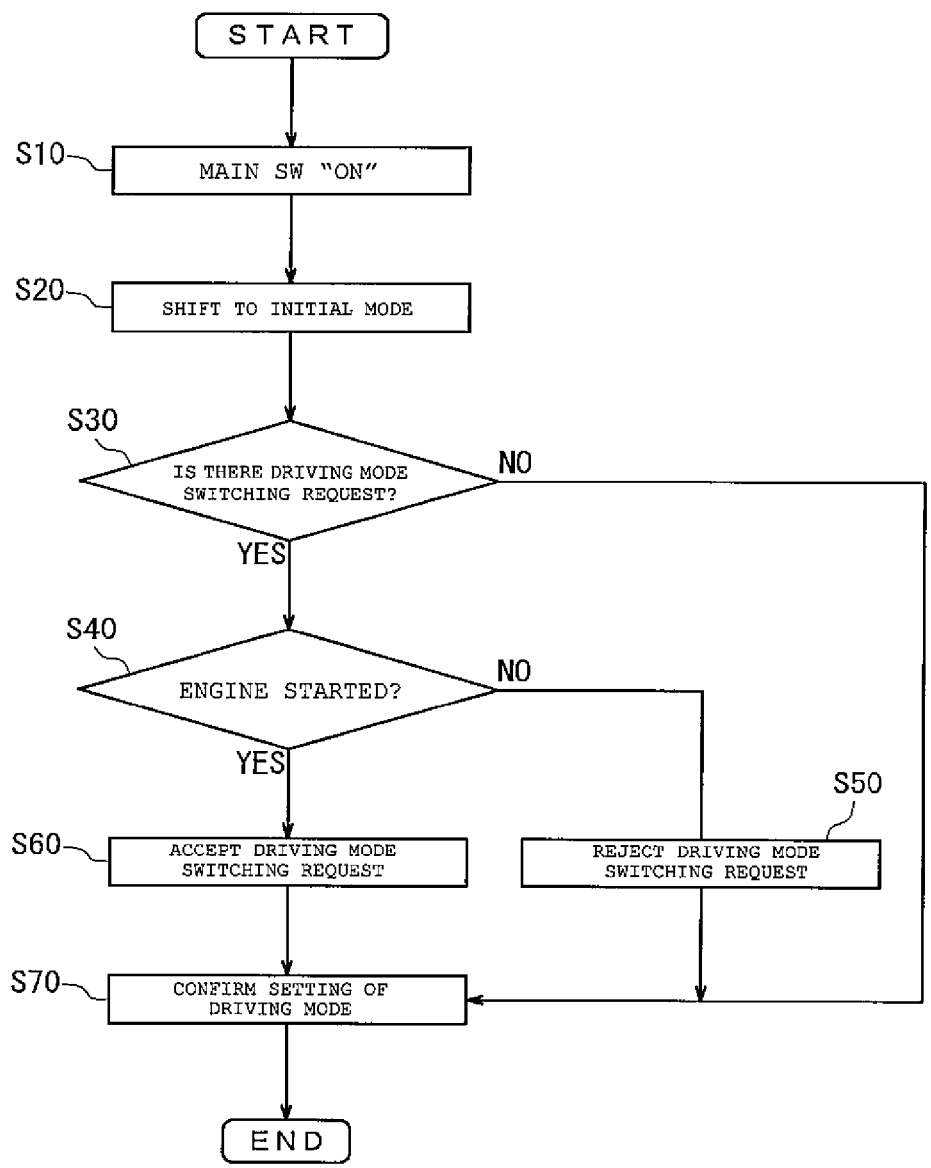
FIG. 5 is a flow chart of a control device according to the embodiment of the invention.

In this embodiment, a CVT 230 including a metal V-belt ("metal belt CVT") is modified in various ways, in addition to including a metal belt 233 as the V-belt, as shown in FIG. 5.

Metal belt CVT 230 includes a clutch 250, a primary rotation sensor 229 and an actuator. The actuator comprises hydraulic cylinders 260A, 260B, and a hydraulic control valve 260C.

Clutch 250 is disposed between an output shaft of engine 20 and an input shaft of metal belt CVT 230. Clutch 250 connects/disconnects transmission of power between the output shaft of engine 20 and the input shaft of metal belt CVT 230.

Primary rotation sensor 229 detects the rotation speed of a primary sheave 232. Control device 10 computes the speed change ratio of CVT 230 using the ratio of the rotation speed of primary sheave 232 detected by primary rotation sensor 229 and the vehicle speed of the straddle-type vehicle detected by a vehicle speed sensor 252 (a rear wheel speed sensor in the figure). The speed change ratio of CVT 230 may be computed using the ratio between the rotation speed of primary sheave 232 detected by primary rotation sensor 229 and the rotation speed of a secondary sheave 234 detected by a secondary sheave rotation speed sensor 269.

Hydraulic cylinder 260A adjusts the groove width of primary sheave 232 by applying a pressing force to a movable flange 232B of primary sheave 232. Hydraulic cylinder 260B adjusts the groove width of secondary sheave 234 by applying a pushing force to a movable flange 234B of secondary sheave 234. Hydraulic control valve 260C adjusts the hydraulic pressure applied to hydraulic cylinders 260A, 260B. Hydraulic control valve 260C is controlled by control device 10 and performs control such that, when the hydraulic pressure of one hydraulic cylinder 260A (260B) is increased, the hydraulic pressure of the other hydraulic cylinder 260B (260A) is reduced.

The speed change ratio of metal belt CVT 230 is changed by control device 10 operating hydraulic control valve 260C. Control device 10 controls metal belt CVT 230 in a similar manner to controlling CVT 30. In metal belt CVT 230, control device 10 uses the rotation speed of primary sheave 232 as a control target value, instead of using the engine speed as the control target value.

In this embodiment, a fourth control 14 is combined with first control 11, second control 12 and third control 13 described above. That is, the control device performs first control 11, second control 12, third control 13 and fourth control 14, respectively, as shown in FIG. 8. In first control 11, before the start of the engine, the driving mode is switched to a determined driving mode among a plurality of driving modes that has been determined in advance. In second control 12, the plurality of driving modes are switched between in response to operation of the mode switching operation member. In third control 13, when the control device detects that the engine has not yet been started, it limits the second control, and inhibits switching from the determined driving mode to another driving mode. In fourth control 14, when the control device detects that the engine has just been started and when the driving mode has not been switched to the determined driving mode, the control device switches the driving mode to the determined driving mode.

With the above-described configuration, even if the driving mode cannot be fixed in the determined driving mode (A) before the start of the engine because of some mechanical failure, the driving mode can be switched to the determined driving mode (A) immediately after the start of the engine by fourth control 14. Further, even when fourth control 14 does not function, the driving mode can be fixed in driving mode (A) before the start of the engine by the first control to the third control.

Although straddle-type vehicle 100 shown in FIG. 1 is a scooter motorcycle, the invention is not limited to this. The invention may be applied to any straddle-type vehicle as long as it is provided with a control device that electronically controls shifting of a CVT. For example, the invention may be applied to a four-wheel buggy (ATV: All Terrain Vehicle), a snow mobile etc., as well as to a scooter motorcycle. In the case of a four-wheel buggy or the like, as an accelerator operation member, a lever may be used instead of an accelerator grip. Moreover, it is also possible to employ a straddle-type vehicle provided with a motor rather than an internal combustion engine.

The invention has been described above based on the exemplary embodiments. However, the invention is not limited by the description, and permits of various modified forms.

According to the invention, a straddle-type vehicle capable of sufficiently ensuring drivability when starting on a downward slope is provided.

The invention claimed is:

1. A straddle vehicle provided with an engine having an output that is controlled in response to an accelerator operation member, a continuously variable transmission connected to the engine, and a control device that controls the continuously variable transmission, comprising:
    a mode switching operation member,
    wherein a plurality of driving modes are set in the control device, and
    the control device performs
        a first control that switches from one of the plurality of driving modes, before start of the engine, to a determined driving mode among the plurality of driving modes that has been determined in advance,
        a second control that switches between the plurality of driving modes in response to the mode switching operation member, and
        a third control that limits the second control and inhibits switching from the determined driving mode to another driving mode, when the control device detects that the engine has not been started.

2. The straddle vehicle according to claim 1, wherein, when the control device detects that the engine has just been started and when switching to the determined driving mode has not been performed, the control device performs a fourth control that switches from one of the plurality of driving modes to the determined driving mode.

3. The straddle vehicle according to claim 1, further comprising:
    an engine speed sensor that detects a rotation speed of the engine, wherein the control device detects whether the engine has not been started based on whether the rotation speed of the engine detected by the engine speed sensor is zero.

4. A power unit provided with an engine, and a continuously variable transmission that is connected to the engine and controlled by a control device, wherein:
    a plurality of driving modes are set in the control device, and
    the control device performs
        a first control that switches from one of the plurality of driving modes, before start of the engine, to a determined driving mode among the plurality of driving modes that has been determined in advance,
        a second control that switches between the plurality of driving modes in response to operation of a mode switching operation member, and
        a third control that limits the second control and inhibits switching from the determined driving mode to another driving mode, when the control device detects that the engine has not been started.

5. The power unit according to claim 4, wherein, when the control device detects that the engine has just been started and when the switching to the determined driving mode has not been performed, the control device performs a fourth control that switches from one of the plurality of driving modes to the determined driving mode.

6. The power unit according to claim 4, further comprising:
    an engine speed sensor that detects a rotation speed of the engine, wherein the control device detects whether the engine has not been started based on whether the rotation speed of the engine detected by the engine speed sensor is zero.

7. A continuously variable transmission controlled by a control device, wherein:
    a plurality of driving modes are set in the control device, and
    the control device performs
        a first control that switches from one of the plurality of driving modes, before start of an engine, to a determined driving mode among the plurality of driving modes that has been determined in advance,
        a second control that switches between the plurality of driving modes in response to operation of a mode switching operation member, and
        a third control that limits the second control and inhibits switching from the determined driving mode to another driving mode, when the control device detects that the engine has not been started.

8. The continuously variable transmission according to claim 7, wherein, when the control device detects that the engine has just been started and when the switching to the determined driving mode has not been performed, the control device performs a fourth control that switches from one of the plurality of driving modes to the determined driving mode.

9. The continuously variable transmission according to claim 7, wherein the control device detects whether the engine has not been started based on whether the rotation speed of the engine detected by the engine speed sensor is zero.

* * * * *